(12) United States Patent
Jones et al.

(10) Patent No.: US 7,103,844 B2
(45) Date of Patent: Sep. 5, 2006

(54) PORTAL/PORTLET APPLICATION DATA SYNCHRONIZATION

(75) Inventors: Carol A. Jones, Raleigh, NC (US);
Michael S. Karasick, Austin, TX (US);
David B. Lection, Raleigh, NC (US);
David M. Oliver, Pleasantville, NY (US); Michael C. Wanderski, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 10/180,566

(22) Filed: Jun. 26, 2002

(65) Prior Publication Data
US 2004/0001565 A1  Jan. 1, 2004

(51) Int. Cl.
*G06F 3/00* (2006.01)

(52) U.S. Cl. .............. 715/742; 715/513; 715/744; 715/747; 709/203; 709/217; 707/1; 707/3; 707/102

(58) Field of Classification Search .......... 375/354; 345/169; 707/10, 201, 203, 217, 1, 3; 715/742, 715/513, 744, 747; 709/203, 217
See application file for complete search history.

(56) References Cited

U.S. PATENT DOCUMENTS

| | | | | |
|---|---|---|---|---|
| 5,854,624 | A * | 12/1998 | Grant | 345/169 |
| 6,003,065 | A * | 12/1999 | Yan et al. | 709/201 |
| 6,199,099 | B1 * | 3/2001 | Gershman et al. | 709/203 |
| 6,243,596 | B1 * | 6/2001 | Kikinis | 455/572 |
| 6,269,369 | B1 * | 7/2001 | Robertson | 707/10 |
| 2001/0005364 | A1 | 6/2001 | Kang | 370/350 |
| 2001/0009016 | A1 * | 7/2001 | Hofmann et al. | 709/219 |
| 2001/0034771 | A1 * | 10/2001 | Hutsch et al. | 709/217 |

FOREIGN PATENT DOCUMENTS

| | | |
|---|---|---|
| JP | 2000-156704 | 6/2000 |
| WO | WO0062201 | 10/2000 |

OTHER PUBLICATIONS

Carl Lagoze et al.; The Warwick Framework: A Container Architecture for Aggregating Sets of Metadata; Jun. 28, 1996;Cornell University Library; http://techreports.library.cornell.edu:8081/Dienst/UI/1.0/Display/cul.cs/TR96-1593.*

D.B. Lection, *WebSphere Portal Server Programming: Portal Application Programming*, DeveloperWorks: IBM Developer Solutions, <http://www-106.ibm.com/developerworks/library/i-portal/, Nov. 6, 2001).

(Continued)

*Primary Examiner*—Jay K. Patel
*Assistant Examiner*—Adolf DSouza
(74) *Attorney, Agent, or Firm*—Gerald R. Woods, Esq.; Steven M. Greenberg, Esq.; Carey Rodriguez Greenberg & Paul LLP

(57) ABSTRACT

A portlet data synchronization system, method and apparatus. The system can include a portal server configured to distribute portal content to requesting clients over a computer communications network. The system further can include one or more portlets hosted within the portal content through the portal server. Finally, the system can include a synchronization aggregator configured to aggregate synchronization markup for individual ones of the portlets in a single synchronization envelope. The synchronization aggregator further can be have a configuration for distributing responses to the synchronization markup to respective ones of the portlets.

7 Claims, 2 Drawing Sheets

OTHER PUBLICATIONS

*WebSphere Portal Server, What is a Portlet?, IBM Corp.,* <http://www-3.ibm..com/software/webservers/portlet/portlet.html>, (visited Jun. 5, 2002).

*Tracker Newsletter, SiteScape,* <http://www.sitescape.com/next/tracker_may2001.html>, (visited Jun. 5, 2002).

* cited by examiner

PORTAL/PORTLET APPLICATION DATA SYNCHRONIZATION

BACKGROUND OF THE INVENTION

1. Statement of the Technical Field

The present invention relates to the field of portals and portlets and more particularly to the synchronization of application data through a portal associated with one or more portlets.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Despite advances in portal and portlet rendering technologies, to date, portals and their associated portlets do not account for data synchronization. Data synchronization in conventional client-server computing relates to the synchronization of application data between server and client. Well-known examples of data synchronization can be identified within conventional document management systems and personal information managers. Still, in the context of applications and content delivered using portlet technology, data synchronization technology remains conspicuously absent. Thus, while a portlet application can display personalized content through a content browser, the portlet cannot transfer and synchronize data to an application client residing on the computing device of the end-user.

SUMMARY OF THE INVENTION

The present invention is a portlet data synchronization method, system and apparatus. A portlet data synchronization method can include the step of requesting data synchronization from one or more participating portlets responsive to receiving a data synchronization request. Subsequently, synchronization markup received from the participating portlets can be aggregated in a single synchronization envelope. The single synchronization envelope can be forwarded to a synchronization agent coupled to individual client applications, each individual client application corresponding to one of the participating portlets. Finally, responses received from corresponding ones of the individual client applications can be distributed to the participating portlets.

Notably, synchronization markup generated in response to the distributed responses can be further aggregated in a single synchronization envelope. Also, the single synchronization envelope containing the further aggregations can be further forwarded to the synchronization agent. In response to the further aggregations, further responses can be received. Finally, each of the steps of further aggregating, further forwarding, and further receiving can be repeated until each one of the participating portlets and the individual client applications signal quiescence.

In a preferred aspect of the invention, the requesting step can include determining from the data synchronization request a preferred synchronization markup language. For each one of the portlets, those portlets able to support data synchronization using the preferred synchronization markup language can be identified from a corresponding portlet application descriptor. In consequence, data synchronization can be requested only from the identified portlets.

The aggregating step can include incorporating the synchronization markup received from the participating portlets in a single document. The single document itself can be formatted using a portlet envelope markup language having a construct which is not specific to any one particular synchronization markup language. Finally, the method can include identifying from the responses synchronization conflicts for individual ones of the participating portlets. As the synchronization conflicts are identified, the individual participating portlets can prompt the end user for conflict resolution.

A portlet data synchronization system can include a portal server configured to distribute portal content to requesting clients over a computer communications network. The system further can include one or more portlets hosted within the portal content through the portal server. Finally, the system can include a synchronization aggregator configured to aggregate synchronization markup for individual ones of the portlets in a single synchronization envelope. The synchronization aggregator further can be have a configuration for distributing responses to the synchronization markup to respective ones of the portlets.

A synchronization agent can include a first communications component configured to communicatively link the synchronization agent to a one or more client applications. Each client application can have an association with at least one or more portlets. A second communications component can be configured to communicatively link the synchronization agent to a portal server configured to host content provided by the portlets. Parsing logic can be configured to identify and extract from a single synchronization envelope received through the second communications component, individual ones of synchronization markup associated with individual ones of the portlets.

Distribution logic can be configured to distribute extracted synchronization markup associated with the individual ones of the portlets to associated ones of the client applications through the first communications component. Finally, aggregation logic can be configured to aggregate responses to the synchronization markup received from the client applications through the first communications component. The aggregation logic can be further configured to forward the aggregated responses through the second communications component.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a data synchronization system, method and apparatus with which application data presented through portlets in a portal can be synchronized with an end-user computing device over a computer communications network. In accordance with the inventive arrangements, in response to a synchronization request, a portal server can encapsulate synchronization markup scripts for individual selected portlets in a, synchronization envelope. Subsequently, the synchronization envelope can be forwarded over the computer communications network to a synchronization agent associated with the end-user. The synchronization agent, in turn, can extract each synchronization markup script in the synchronization envelope, and can provide the extracted synchronization markup scripts to underlying client applications associated with the portlets.

The client applications associated with the portlets can process their respective synchronization markup scripts, and the client applications can generate responses, such as updates, update acknowledgments, or conflict identification. The responses can be provided to the synchronization agent, which in turn, can forward the responses to the host portal. The host portal, in turn, can forward individual responses to corresponding portlets in which the responses can be processed. In this way, the data synchronization process for individual portlets in a portal can be provided over the computer communications network with a minimal of network resource consumption without further requiring separate communications channels between each portlet and the end-user.

Figure 1:
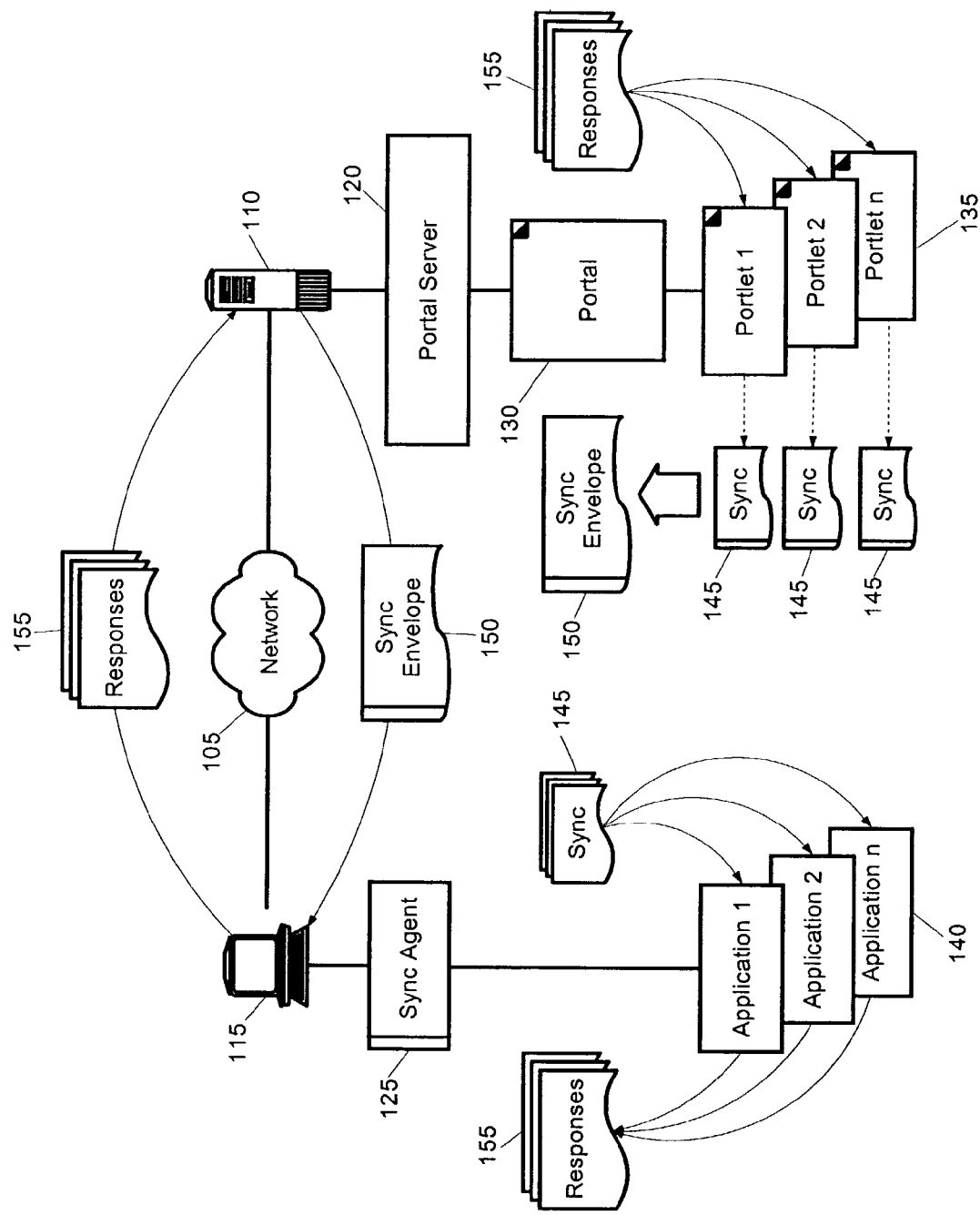
FIG. 1 is a schematic illustration of a client-server system configured to perform a portlet data synchronization process in accordance with the inventive arrangements; and, FIG. 2 is a flow chart illustrating a process of synchronizing portlet data in the system of FIG. 1.

FIG. 1 is a schematic illustration of a client-server system configured to perform a portlet data synchronization process in accordance with the inventive arrangements. The client-server system can include one or more client computing devices 115 operatively linked to a server computing device 110 over a computer communications network 105. The server computing device 110 can host a portal server 120 through which portal content 130 can be distributed on demand to requesting client computing devices 115.

The portal content 130 can include one or more portlets 135 configured to deliver personalized content to the client computing device 115. Specifically, while some of the portlets 135 merely can deliver content for display in a content browser, others of the portlets 135 can deliver content which can be further processed in applications 140 hosted within or in association with the client computing device 115. For example, one type of portlet 135 can include a personal information manager (PIM) with which an end user can interact. In the case of a PIM, the end user can also interact with a mirrored set of PIM data off-line in a stand-alone computing device such as a pervasive computing device or a personal computing device. In consequence, where end users interact with mirrored sets of data, such as the case with a portlet distributed PIM, a synchronization process can be required between the applications 140 and corresponding portlets 135.

In accordance with the inventive arrangements, a synchronization process for synchronizing portlet data through a portal 130 with client-side applications 140 can be performed in a manner analogous to the aggregation process performed by a portal server 120 when including portlet 135 content in a portal 130. In particular, in the portal/portlet data synchronization process of the present invention, the portal server 120 can forward a data synchronization request to each participating portlet 135 hosted through the portal 130. In response to receiving the data synchronization request, each participating portlet 135 can generate synchronization markup 145.

The synchronization markup 145 can include synchronization data and instructions formatted according to a synchronization markup language, for example SynchML. Once the synchronization markup 145 has been generated by the portlets 135, the portlets 135 can forward the synchronization markup 145 to the portal server 120. As the portal server 120 receives the forwarded synchronization markup 145 from associated portlets 135, the portal server 120 can encapsulate the synchronization markup 145 within a synchronization envelope 150.

For instance, the synchronization markup 145 for each portlet 135 can be included inline within a single markup language document, such as an extensible markup language (XML) formatted document. Appendix A includes exemplary synchronization envelope 150. Notably, as will be apparent from the markup of Appendix A, the synchronization envelope 150 can specify the synchronization markup language for each embedded segment of synchronization markup 145. Once the synchronization envelope 150 has been generated, the synchronization envelope 150 can be forwarded across the computer communications network 105 to a synchronization agent 125 associated with or disposed within the client computing device 115.

Upon receiving the synchronization envelope 150, the synchronization agent 125 can extract the individual synchronization markup 145 and can distribute the synchronization markup 145 to respective ones of the applications 140. Each one of the applications 140, upon receiving respective synchronization markup 145, can process the synchronization data and instructions formatted within the synchronization markup 145. Subsequently, where applicable, each one of the applications 140 can generate a response 155. For instance, the response 155 can include additional synchronization data and instructions. Alternatively, the response 155 can merely include an acknowledgment of the receipt of the synchronization markup 145.

In any case, each one of the applications 140 can return the response 155 to the synchronization agent 125 which can aggregate the responses 155 and can forward the responses 155 across the computer communications network 105 to the portal server 120 in the server computing device 110. Upon receiving the responses 155, the portal server 120 can distribute individual ones of the responses 155 to associated portlets 135. The process can continue with a series of synchronization envelopes 150 and resulting responses 155 until the synchronization process has completed with respect to each portlet 135 participating in the synchronization process.

Figure 2:
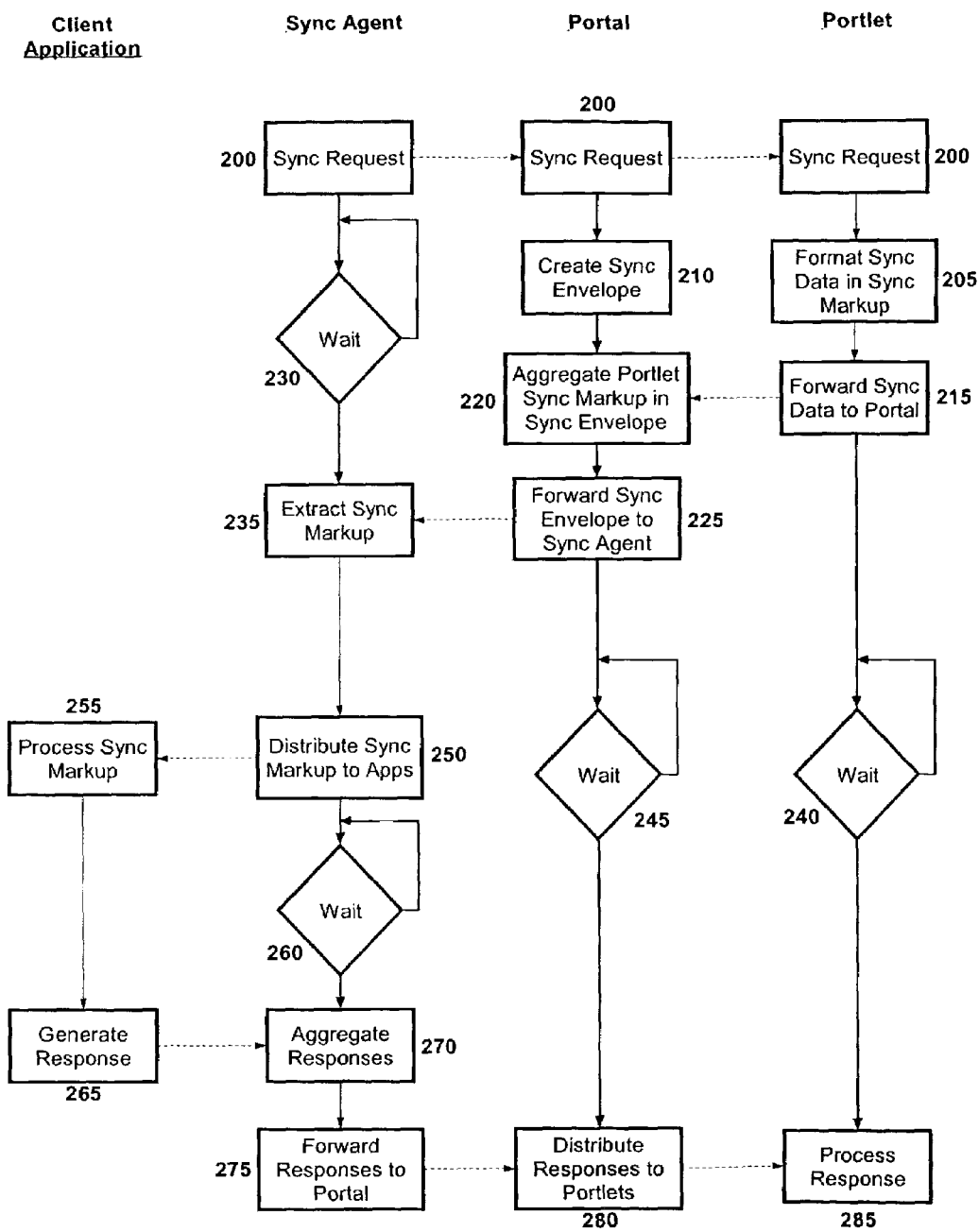

FIG. 2 is a flow chart illustrating a process of synchronizing portlet data in the system of FIG. 1. Specifically, FIG. 2 includes four distinct, but interrelated flow charts for each of the individual client applications, the synchronization agent, the portal server and the individual portlets configured to participate in the synchronization process of the present invention. The process can begin with a synchronization request issued by a client computing device and directed towards the portal server. In blocks 200, the synchronization request can be propagated from the portal server to participating portlets. The synchronization request can be communicated between client and portal server in a communications flow which remains separate from the portal user interface.

In block 230, once the synchronization request has been issued, the synchronization agent can wait for a response from the portal server. Concurrently, in block 210 the portal server in response to receiving the synchronization request can create a synchronization envelope. Also, in block 205, each participating portlet can format synchronization content and instructions according to a known synchronization markup language. Subsequently, in block 215 the portlet can forward the synchronization markup to the portal server.

In block 220, the portal server can aggregate the synchronization markup received from each participating portlet. Specifically, the portal server can insert the synchronization markup in the synchronization envelope. Once the synchronization envelope has been completed, in block 225 the portal server can forward the synchronization envelope to the synchronization agent and in block 245, the portal server can wait for a response.

In block 235, having received the synchronization envelope from the portal server, the synchronization agent can extract individual instances of the synchronization markup from the synchronization envelope. In block 250, the synchronization agent can distribute the individual instances of the synchronization markup to their respective applications. Once the individual instances of the synchronization markup have been distributed to the respective applications, in block 260, the synchronization agent can await responses issued by the client applications in the course of processing the synchronization markup.

Specifically, in block 255, each individual client application can process the synchronization markup. In response, in block 265 the client application can generate a response, for instance companion synchronization data, synchronization instructions or conflict identification data. Alternatively, the client application simply can include an acknowledgment within the response. In any case, the client application can forward the generated response to the synchronization agent which can aggregate all received responses in block 270.

Once the responses have been aggregated, in block 275 the synchronization agent can post the aggregated responses to the portal server, which in turn, in block 280 can distribute the individual ones of the aggregated responses to the respective portlets which can process the responses in block 285. Where a synchronization conflict has been identified for a particular portlet, the portlet can display the conflict and can request manual conflict resolution through the portlet. The synchronization conversation can continue between portlet and client application until each participating portlet and client application signal quiescence.

Importantly, the portal/portlet data synchronization process of the present invention can provide the foundation for data synchronization between portlets and their respective client application counterparts. Furthermore, the use of the inventive synchronization process permits the portal itself to act as the communication vehicle for synchronizing portlet data. Moreover, as the portal can support multiple markup languages for encapsulating synchronization markup, a multiplicity of clients and service levels can be supported. Finally, as individual synchronization markup can be specified according to varying synchronization markup languages, portlets can select individual synchronization markup languages according to the requirements, capabilities and functions of the corresponding client application.

The present invention can be realized in hardware, software, or a combination of hardware and software. An implementation of the portal/portlet data synchronization process, system and apparatus of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A portlet data synchronization method, said method comprising the steps of:

responsive to receiving a data synchronization request, requesting data synchronization from a plurality of participating portlets;

aggregating in a single synchronization envelope, synchronization markup received from said participating portlets;

forwarding said single synchronization envelope to a synchronization agent coupled to individual client applications, each said individual client application corresponding to one of said participating portlets; and, distributing to said participating portlets, responses received from corresponding ones of said individual client applications.

2. The method of claim 1, further comprising the steps of:

further aggregating in a single synchronization envelope, synchronization markup generated in response to said distributed responses;

further forwarding said single synchronization envelope containing said further aggregations to said synchronization agent;

further receiving in response to said further aggregations, further responses; and, repeating said steps of further aggregating, further forwarding, and further receiving until each one of said participating portlets and said individual client applications signal quiescence.

3. The method of claim 1, wherein said requesting step comprises the steps of:
determining from said data synchronization request a preferred synchronization markup language;
identifying for each one of said portlets from a corresponding portlet application descriptor, those portlets able to support data synchronization using said preferred synchronization markup language; and,
requesting data synchronization from said identified portlets.

4. The method of claim 1, wherein said aggregating step comprises the steps of:
incorporating said synchronization markup received from said participating portlets in a single document; and,
formatting said document in a portlet envelope markup language having a construct which is not specific to any one particular synchronization markup language.

5. The method of claim 1, further comprising the steps of:
identifying from said responses synchronization conflicts for individual ones of said participating portlets; and,
prompting for conflict resolution through said individual ones of said participating portlets.

6. A portlet data synchronization system comprising:
a portal server configured to distribute portal content to requesting clients over a computer communications network;
a plurality of portlets hosted within said portal content through said portal server; and,
a synchronization aggregator configured to aggregate synchronization markup for individual ones of said portlets in a single synchronization envelope, said synchronization aggregator having a further configuration for distributing responses to said synchronization markup to respective ones of said portlets.

7. A synchronization agent comprising:
a first communications component configured to communicatively link the synchronization agent to a plurality of client applications, each said client application having an association with at least one of a plurality of portlets;
a second communications component configured to communicatively link the synchronization agent to a portal server configured to host content provided by said portlets;
parsing logic configured to identify and extract from a single synchronization envelope received through said second communications component, individual ones of synchronization markup associated with individual ones of said portlets;
distribution logic configured to distribute extracted synchronization markup associated with said individual ones of said portlets to associated ones of said client applications through said first communications component; and,
aggregation logic configured to aggregate responses to said synchronization markup received from said client applications through said first communications component, and to forward said aggregated responses through said second communications component.

* * * * *